(12) United States Patent
Chen et al.

(10) Patent No.: US 11,341,028 B2
(45) Date of Patent: May 24, 2022

(54) STRUCTURED QUERY LANGUAGE RUNTIME ACCESS PATH GENERATION FOR DEEP TEST IN A DATABASE

(71) Applicant: International Business Machines Corporation, Armonk, NY (US)

(72) Inventors: Xiao Xiao Chen, Beijing (CN); ShengYan Sun, Beijing (CN); Xiaobo Wang, Beijing (CN); Shuo Li, Beijing (CN); Hong Mei Zhang, Beijing (CN); Xiao Hui Xh Wang, Beijing (CN); Ye Tao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 16/732,775

(22) Filed: Jan. 2, 2020

(65) Prior Publication Data
US 2021/0209004 A1   Jul. 8, 2021

(51) Int. Cl.
*G06F 16/23* (2019.01)
*G06F 16/21* (2019.01)
*G06F 11/36* (2006.01)

(52) U.S. Cl.
CPC ...... *G06F 11/3664* (2013.01); *G06F 11/3612* (2013.01); *G06F 11/3688* (2013.01); *G06F 16/217* (2019.01); *G06F 16/2365* (2019.01)

(58) Field of Classification Search
CPC .......................... G06F 16/217; G06F 16/2365
USPC ...................................................... 707/690
See application file for complete search history.

(56) References Cited

U.S. PATENT DOCUMENTS

| | | | |
|---|---|---|---|
| 10,698,892 B2* | 6/2020 | Sung | G06F 16/2255 |
| 2009/0106219 A1* | 4/2009 | Belknap | G06F 16/24542 |
| 2010/0192006 A1* | 7/2010 | Gharat | G06F 11/3688 |
| | | | 714/E11.023 |

(Continued)

FOREIGN PATENT DOCUMENTS

| | | |
|---|---|---|
| CN | 105446743 A | 3/2016 |
| CN | 109271326 A | 1/2019 |

OTHER PUBLICATIONS

Khalek et al., "Automated SQL Query Generation for Systematic Testing of Database Engines," 25th IEEE/ACM International Conference on Automated Software Engineering, Antwerp, Belgium, Sep. 20-24, 2010, 4 pages. http://citeseerx.ist.psu.edu/viewdoc/download?doi=10.1.1.233.446&rep=rep1&type=pdf.

*Primary Examiner* — James Trujillo
*Assistant Examiner* — Fariborz Khoshnoodi
(74) *Attorney, Agent, or Firm* — Yee & Associates, P.C.

(57) ABSTRACT

Functional verification of a new database feature is provided. A set of SQL query seeds are evolved using information contained in a knowledge map that was generated based on a real SQL query workload of an entity corresponding to a database. Real SQL queries are identified in the database that are similar to the evolved set of sample SQL query seeds. A new feature to be implemented in the database is injected into the real SQL queries that are similar to the evolved set of sample SQL query seeds. Multiple runtime access paths are generated for each of the real SQL queries injected with the new feature for output cross validation. Each of the real SQL queries injected with the new feature is run in a test environment using each of the multiple runtime access paths corresponding to a real SQL query injected with the new feature for functional verification.

20 Claims, 11 Drawing Sheets

(56) References Cited

U.S. PATENT DOCUMENTS

| | | | |
|---|---|---|---|
| 2015/0339483 A1* | 11/2015 | Buschman | G06F 16/2428 |
| | | | 707/781 |
| 2019/0294596 A1* | 9/2019 | Yan | G06F 11/301 |
| 2020/0226109 A1* | 7/2020 | Das | G06F 16/27 |

* cited by examiner

MATRIXES 400

KEYWORD-KEYWORD MATRIX 402

KEYWORDS 410

| | ORDER BY | GROUP BY | DISTRICT | ○ ○ ○ | MAX | SUM | AVG |
|---|---|---|---|---|---|---|---|
| ORDER BY | 0 | 0 | 6 | ○ ○ ○ | 0 | 0 | 0 |
| GROUP BY | 0 | 0 | 9 | ○ ○ ○ | 15 | 29 | 35 |
| DISTRICT | 6 | 9 | 0 | ○ ○ ○ | 0 | 0 | 0 |
| ○ ○ ○ | ○ | ○ | ○ | ○ | ○ | ○ | ○ |
| MAX | 0 | 15 | 0 | ○ ○ ○ | 2 | 8 | 13 |
| SUM | 0 | 29 | 7 | ○ ○ ○ | 8 | 5 | 9 |
| AVG | 0 | 35 | 4 | ○ ○ ○ | 13 | 9 | 1 |

KEYWORDS 408

ACCESS PATH-ACCESS PATH MATRIX 404

ACCESS PATHS 414

| | SORT COMPOSITE | SORT NEW | NEST LOOP JOIN | ○ ○ ○ |
|---|---|---|---|---|
| RID ACCESS | 0 | 0 | 6 | ○ ○ ○ |
| R-SCAN | 0 | 0 | 9 | ○ ○ ○ |
| INDEX ACCESS | 6 | 9 | 0 | ○ ○ ○ |
| ○ ○ ○ | ○ | ○ | ○ | ○ |
| IN-LIST | 0 | 17 | 0 | ○ ○ ○ |

ACCESS PATHS 412

KEYWORD-ACCESS PATH MATRIX 406

KEYWORDS 418

| | ORDER BY | GROUP BY | DISTINCT | ○ ○ ○ |
|---|---|---|---|---|
| RID ACCESS | 0 | 0 | 0 | ○ ○ ○ |
| R-SCAN | 0 | 0 | 0 | ○ ○ ○ |
| INDEX ACCESS | 6 | 9 | 5 | ○ ○ ○ |
| ○ ○ ○ | ○ | ○ | ○ | ○ |
| IN-LIST | 0 | 17 | 0 | ○ ○ ○ |
| MULTI INDEX | 0 | 24 | 0 | ○ ○ ○ |

ACCESS PATHS 416

FIG. 4

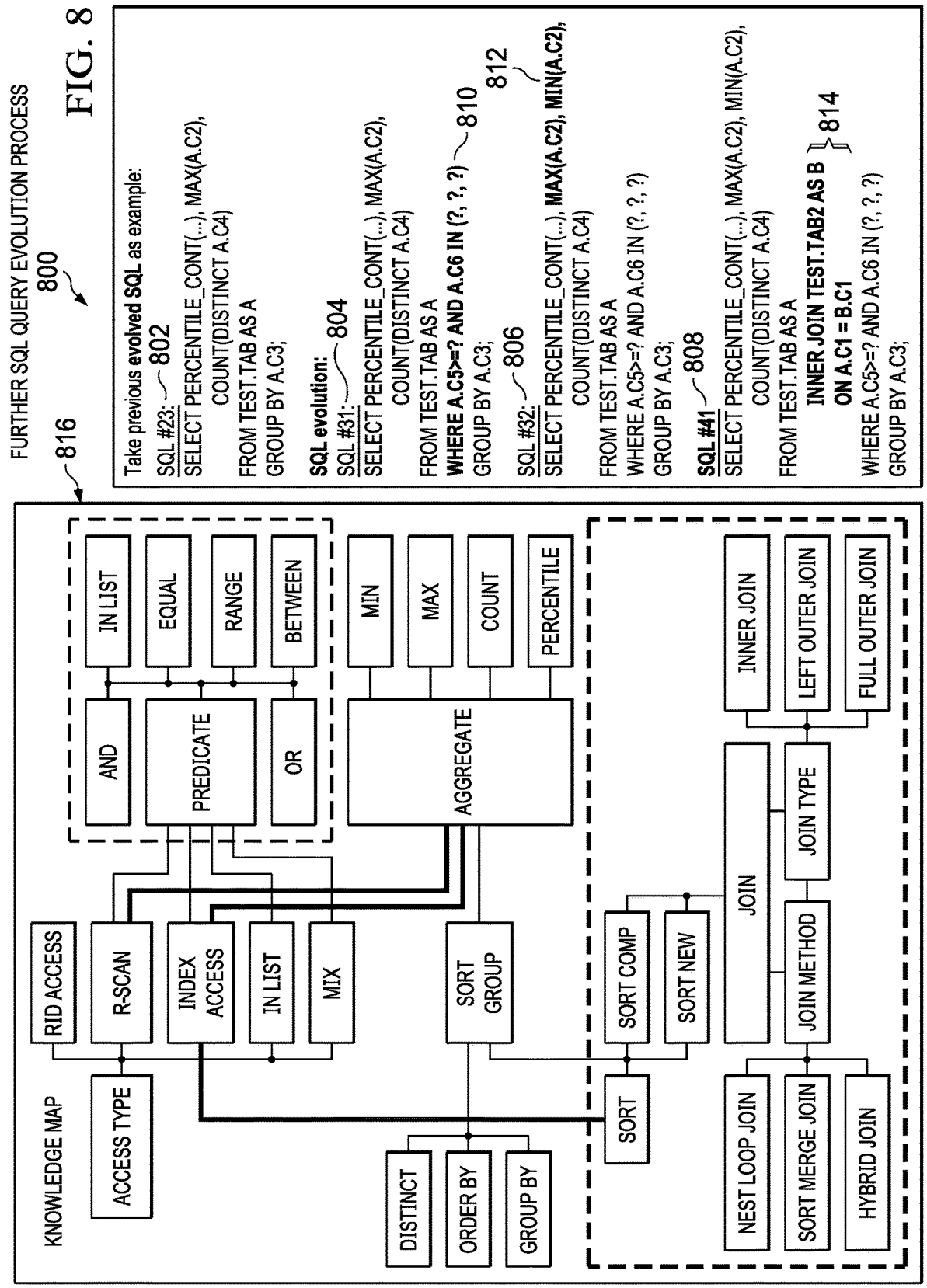

STRUCTURED QUERY LANGUAGE RUNTIME ACCESS PATH GENERATION FOR DEEP TEST IN A DATABASE

BACKGROUND

1. Field

The disclosure relates generally to structured query language (SQL) and more specifically to generating SQL functional verification testcases corresponding to a new feature of a cloud database.

2. Description of the Related Art

SQL is a domain-specific language used in programming and designed for managing data stored in a relational database. SQL is particularly useful in handling structured data (i.e., data incorporating relationships among entities and variables). SQL offers advantages, such as, for example, accessing many records with one single command, eliminating a need to specify how to reach a record (e.g., with or without an index), and the like.

SQL consists of many types of statements, which may be classed as sublanguages, such as: a data query language, a data definition language, a data control language, and a data manipulation language. The scope of SQL includes data query, data manipulation (e.g., insert, update, and delete), data definition (e.g., schema creation and modification), and data access control.

The syntax of SQL programming language is subdivided into several language elements, including clauses, expressions, predicates, queries, and statements. Clauses are constituent components of statements and queries. Expressions can produce either scalar values or tables consisting of columns and rows of data. Predicates specify conditions that can be evaluated to SQL three-valued logic (i.e., true/false/unknown) or Boolean truth values and are used to limit the effects of queries and statements. Queries retrieve data based on specific criteria. Statements may have a persistent effect on schema and data or may control transactions, program flow, connections, sessions, or diagnostics.

SUMMARY

According to one illustrative embodiment, a computer-implemented method for functional verification of a new database feature is provided. A computer evolves a set of sample structured query language (SQL) query seeds using information contained in a knowledge map that was generated based on a real SQL query workload of an entity corresponding to a database. The computer identifies real SQL queries in the database that are similar to the evolved set of sample SQL query seeds. The computer injects a new feature to be implemented in the database into the real SQL queries that are similar to the evolved set of sample SQL query seeds. The computer generates multiple runtime access paths for each of the real SQL queries injected with the new feature for output cross validation. The computer runs each of the real SQL queries injected with the new feature in a test environment using each of the multiple runtime access paths corresponding to a real SQL query injected with the new feature for functional verification of the new feature. According to other illustrative embodiments, a computer system and computer program product for functional verification of a new database feature are provided.

BRIEF DESCRIPTION OF THE DRAWINGS

FIG. 4 is a diagram illustrating an example of matrixes in accordance with an illustrative embodiment;

FIG. 8 is a diagram illustrating an example of further SQL query evolution in accordance with an illustrative embodiment;

DETAILED DESCRIPTION

Figure 1:
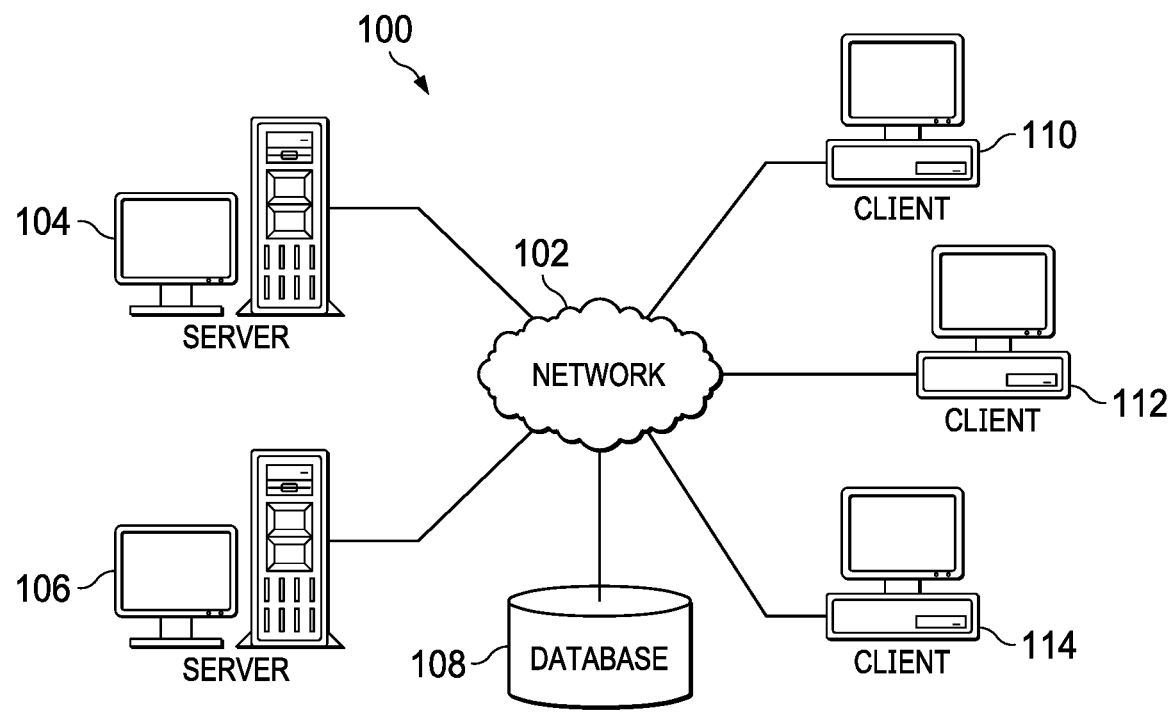
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
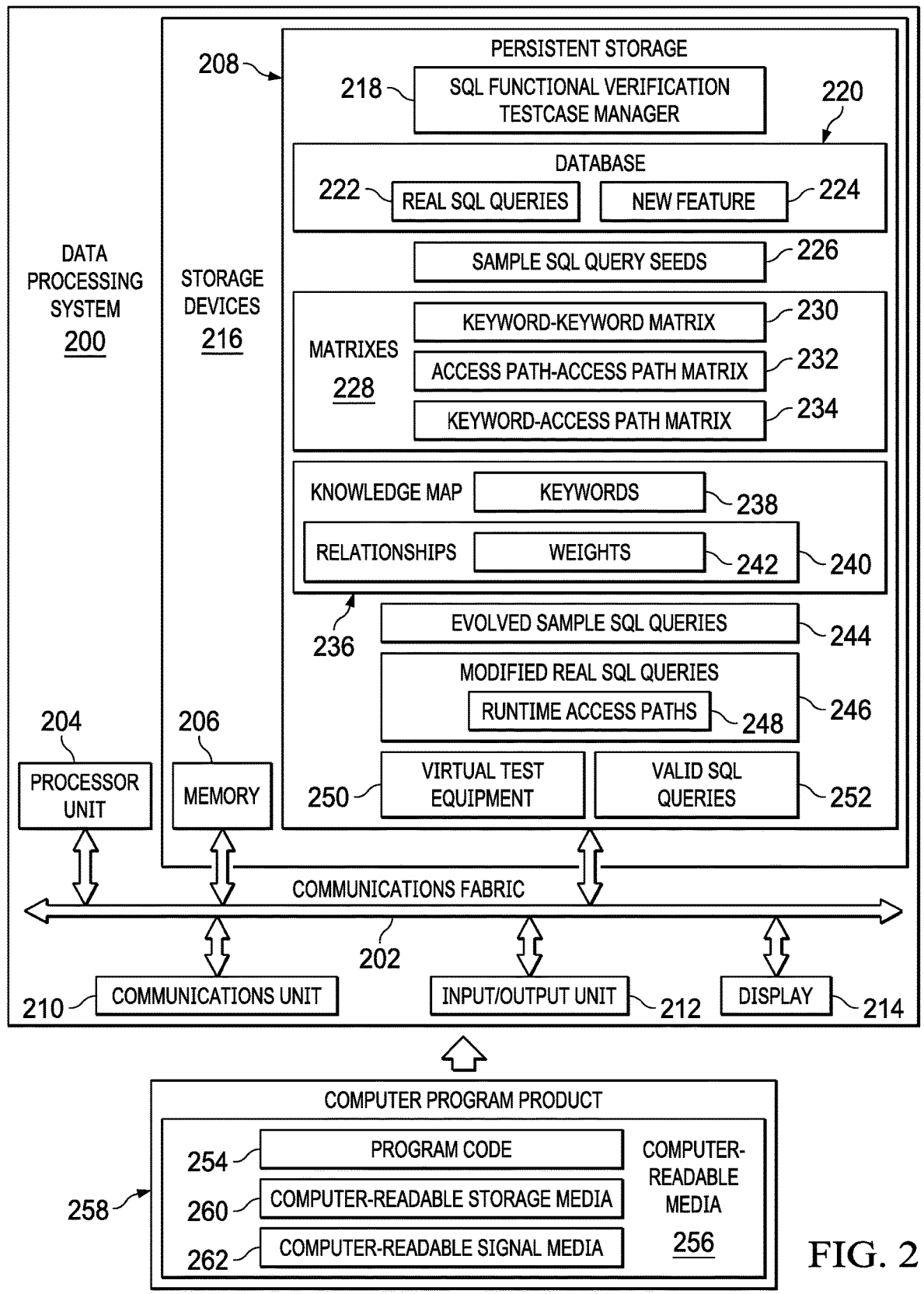
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with database 108. Server 104 and server 106 may be, for example, server computers with high-speed connections to network 102. In addition, server 104 and server 106 may provide services for generating SQL functional verification testcases corresponding to a new feature of a database, such as database 108. Also, server 104 and server 106 may represent computing nodes in one or more cloud environments. Alternatively, server 104 and server 106 may represent computers in one or more data centers.

In this example, database 108 represents a relational database in a relational database management system that is to be implemented with a new feature. The new feature may be any type of relational database feature. Database 108 may be, for example, a set of one or more storage devices capable of storing any type of data in a structured format, such as, for example, one or more tables consisting of columns and rows. The data stored in database 108 may correspond to a specific domain, such as, for example, a business domain, an insurance domain, a medical domain, a financial domain, or the like, which is associated with a particular entity, such as, for example, an enterprise, organization, agency, institution, or the like. In addition, database 108 may represent a plurality of relational databases corresponding to a plurality of different entities. Further, database 108 may be located in a cloud environment.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart televisions, and the like, with wire or wireless communication links to network 102.

Users of clients 110, 112, and 114 may utilize clients 110, 112, and 114 to access and utilize the services provided by server 104 or server 106. For example, a user of client 110 may send an input to server 104 to generate functional verification testcases (i.e., modified real SQL queries) corresponding to the new feature of database 108 and run the generated functional verification testcases in a virtual test environment, such as an isolated virtual sandbox, to ensure operability of the new feature in database 108. It should be noted that the generated functional verification testcases are based on the real SQL query workload of the entity that corresponds to database 108.

In addition, it should be noted that network data processing system 100 may include any number of additional servers, clients, databases, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores SQL functional verification testcase manager 218. However, it should be noted that even though SQL functional verification testcase manager 218 is illustrated as residing in persistent storage 208, in an alternative illustrative embodiment SQL functional verification testcase manager 218 may be a separate component of data processing system 200. For example, SQL functional verification testcase manager 218 may be a hardware component coupled to communication fabric 202 or a combination of hardware and software components. In another alternative illustrative embodiment, a first set of components of SQL functional verification testcase manager 218 may be located in data processing system 200 and a second set of components of SQL functional verification testcase manager 218 may be located in a second data processing system, such as, for example, server 106 in FIG. 1.

SQL functional verification testcase manager 218 controls the process of generating SQL functional verification testcases corresponding to a new feature of a relational database. Database 220 represents an identifier of the relational database that corresponds to a particular entity or customer and is to be implemented with the new feature. The identifier corresponding to database 220 may identify, for example, database 108 in FIG. 1. Database 220 includes real SQL queries 222. Real SQL queries 222 represent the real SQL query workload of the particular entity or customer that corresponds to database 220. Real SQL queries 222 perform a plurality of different operations on the data stored in database 220.

New feature 224 represents an identifier or name of the new feature to be implemented in database 220. New feature 224 may be, for example, SQL PERCENTILE_CONT, which is an analytic function that calculates a percentile based on a continuous distribution of column values in a table. However, new feature 224 may represent any type of SQL feature that can be implemented in database 220.

In response to data processing system 200 receiving an input to generate functional verification testcases corresponding to new feature 224 of database 220, SQL functional verification testcase manager 218 generates sample SQL query seeds 226. Data processing system 200 may receive the input to generate the functional verification testcases from a client device, such as, client 110 in FIG. 1. Sample SQL query seeds 226 represent a plurality of simple, basic, or common SQL queries that contain new feature 224.

SQL functional verification testcase manager 218 generates matrixes 228 based on the real SQL query usage of the entity or customer corresponding to database 220. Matrixes 228 represent a set of matrixes showing the relationships between SQL query keywords and access paths corresponding to the real SQL query workload of database 220. In this example, matrixes 228 include keyword-keyword matrix 230, access path-access path matrix 232, and keyword-access path matrix 234. Keyword-keyword matrix 230 shows the keyword to keyword relationship between different query keywords corresponding to database 220. In other words, keyword-keyword matrix 230 indicates the frequency of how often certain query keywords are used together in database 220. Access path-access path matrix 232 shows the access path to access path relationship between different access paths in database 220. In other words, access path-access path matrix 232 indicates the frequency of how often certain access paths are used together in database 220. Keyword-access path matrix 234 shows the keyword to access path relationship between different query keywords and access paths in database 220. In other words, keyword-access path matrix 234 indicates the frequency of how often certain query keywords and access paths are used together in database 220.

SQL functional verification testcase manager 218 utilizes matrixes 228 to generate weights corresponding to different relationships between query keywords and access paths. For example, SQL functional verification testcase manager 218 may generate a higher weight to a relationship that has a high frequency of occurrence and a lesser weight to a relationship that has as low frequency of occurrence as indicated in matrixes 228.

SQL functional verification testcase manager 218 also utilizes matrixes 228 to generate knowledge map 236. Knowledge map 236 records and outlines relationships 240 between keywords 238. Keywords 238 represent names, words, or phrases that identify the different SQL query predicates, operators, clauses, and the like, as well as, the different access paths corresponding to database 220. SQL functional verification testcase manager 218 assigns weights 242 to the different relationships 240. Weights 242 represent the weights that SQL functional verification testcase manager 218 generated based on the different relationships between query keywords and access paths indicated in matrixes 228. SQL functional verification testcase manager 218 shows keywords 238 as nodes and relationships 240 as edges between nodes in knowledge map 236. SQL functional verification testcase manager 218 applies weights 242 to corresponding edges to indicate strength between the different relationships 240 (e.g., strong relationship, weak relationship, or no relationship).

SQL functional verification testcase manager 218 utilizes knowledge map 236 to generate evolved sample SQL queries 244. Evolved sample SQL queries 244 represent newly evolved sample SQL queries that SQL functional verification testcase manager 218 developed from sample SQL query seeds 226 by adding other SQL clauses that are linked by edges in knowledge map 236 to keywords corresponding to sample SQL query seeds 226.

SQL functional verification testcase manager 218 then searches database 220 to locate real SQL queries within real SQL queries 222 that are similar to evolved sample SQL queries 244. After locating real SQL queries that are similar to evolved sample SQL queries 244, SQL functional verification testcase manager 218 modifies the located real SQL queries by adding new feature 224 to form modified real SQL queries 246. In addition, SQL functional verification testcase manager 218 generates runtime access paths 248 for modified real SQL queries 246. Runtime access paths 248 represent a set of access paths for each particular modified real SQL query within modified real SQL queries 246. A runtime access path specifies how database 220 accesses the data specified by a particular modified real SQL query. For example, the runtime access path may specify indexes and tables that are accessed, access methods that are used, order in which data are accessed, and the like. In other words, the runtime access path is a plan for how the SQL query is executed in database 220.

SQL functional verification testcase manager 218 runs modified real SQL queries 246 in virtual test environment 250 using runtime access paths 248. Virtual test environment 250 is an isolated test environment, such as a virtual sandbox. Virtual test environment 250 may be located within data processing system 200 or may be located in another data processing system, such as, for example, server 106 in FIG. 1.

SQL functional verification testcase manager 218 runs each respective modified real SQL query of modified real SQL queries 246 using each runtime access path of runtime access paths 248 that corresponds to that particular modified real SQL query. After using each runtime access path corresponding to a particular modified real SQL query, SQL functional verification testcase manager 218 compares the output of each runtime access path for output cross validation. Based on the comparison, SQL functional verification testcase manager 218 identifies valid SQL queries 252 for new feature 224. SQL functional verification testcase manager 218 may then transmit valid SQL queries 252 to the client device for user review.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Before a new feature is deployed in a cloud database, a lot of new testcases (i.e., SQL queries) need to be run for quality assurance even though quite a number of software defects would be exposed in a customer environment at an initial stage of software delivery. Manually designing testcases is costly in terms of time and effort and some testcases may be missed due to limitation of knowledge. Also, these designed testcases cannot be the same as or similar to a customer's real query usage. Further, because these designed testcases are developed manually, it is difficult to provide comprehensive test coverage. Furthermore, test data are not as complex or varied as the customer's real data.

Currently, a SQL generator produces SQL testcases for verifying database functionalities according to a "goal-oriented approach" or a "random approach". Because these approaches are SQL syntax-based, coverage of different SQL query access paths cannot be guaranteed. In addition, it would be difficult to ensure validity of SQL queries. Further, newly generated SQL queries using these approaches still cannot simulate the customers' real SQL query usage.

Illustrative embodiments provide a virtual test environment for multiple tenants in a cloud database platform to generate new functional verification testcases based on a customer's real SQL database workload. Illustrative embodiments generate a set of sample SQL query seeds, such as, for example, sample SQL query seed #1 to sample SQL query seed #n, containing a new feature to be implemented in the customer's database. The sample SQL query seeds may be, for example, simple or basic SQL queries.

Illustrative embodiments build a set of matrixes indicating relationships between SQL query keywords and access paths, such as, for example, a keyword to keyword matrix, an access path to access path matrix, and a keyword to access path matrix, based on the customer's real SQL query usage to calculate weights that correspond to the relationships between the different SQL query keywords and access paths (i.e., frequency of use together). In other words, illustrative embodiments determine frequency of query keywords being used together, frequency of query access paths being used together, and frequency of query keywords and access paths being used together based on the customer's real SQL database usage. Illustrative embodiments may utilize, for example, statistical analysis of the customer's real SQL query usage to determine types of SQL queries used, SQL query keyword/access path combinations used, frequency of each combination used, and the like.

Illustrative embodiments generate a knowledge map, which shows the relationships between the different SQL query keywords and access path keywords with the weights, using the set of matrixes built based on the customer's real SQL query usage. Illustrative embodiments may generate the knowledge map based on a set of predefined rules.

Alternatively, illustrative embodiments may generate the knowledge map using a trained clustering machine learning module that can detect the relationships between the different SQL query keywords and access path keywords.

It should be noted that keywords in the knowledge map are, for example, words, terms, phrases, or the like, that correspond to query clauses and access paths. Nodes in the knowledge map represent each of the different SQL query keywords and access path keywords. Edges between nodes represent relationships between the different SQL query keywords and access path keywords. In addition, illustrative embodiments weight respective edges to indicate a level or degree of the relationship between a pair of nodes (i.e., the frequency of use together). Further, illustrative embodiments group related nodes together under an abstract set or topic in the knowledge map. Furthermore, illustrative embodiments add a node corresponding to a keyword of the new feature to the knowledge map. A user, such as, for example, a software developer, database administrator, or the like, can provide the keyword for the new feature.

Illustrative embodiments evolve each sample SQL query seed (e.g., sample SQL query seed #m) in the set containing the new feature using the knowledge map, which is based on the customer's real SQL database usage and oriented by the calculated weights, to generate a newly evolved sample SQL query (e.g., sample SQL query #m+1) for each respective sample SQL query seed in the set. Illustrative embodiments evolve a sample SQL query seed by adding another SQL query clause to the sample SQL query seed. The SQL query clause, which is added to the sample SQL query seed, corresponds to a keyword that is linked by edges to the keyword associated with the sample SQL query seed in the knowledge map.

Illustrative embodiments locate and select real SQL queries, which are similar to the newly evolved sample SQL queries, in the customer's database. Illustrative embodiments modify these selected real SQL queries, which are similar to the newly evolved sample SQL queries, by adding the new feature to these selected real SQL queries. Illustrative embodiments generate a set of runtime access paths for each modified real SQL query containing the new feature for output cross validation.

Illustrative embodiments execute each modified real SQL query containing the new feature in a virtual test environment as the functional verification testcases. Illustrative embodiments compare the output of each modified real SQL query under each different access path in the set corresponding to that particular modified real SQL query to ensure that a valid result is output by that particular modified real SQL query under a particular access path. Illustrative embodiments repeat the process until no real SQL queries, which are similar to the newly generated sample SQL queries, can be located in the customer's database for modification by adding the new feature.

Thus, illustrative embodiments are capable of validating database syntax changes keeping close to customer's real database usage, while also providing beneficial testcase coverage at the same time. Illustrative embodiments automatically generate the functional verification testcases (i.e., modified real SQL queries, each having multiple access paths), which are directed against the new feature of the database. In this way, illustrative embodiments generate more and more functional verification testcases around a keyword of the new feature to ensure that illustrative embodiments can cover all necessary functional verification testcases to ensure the quality of the new feature. Further, illustrative embodiments can decrease cost and effort in generating these functional verification testcases to produce valid SQL queries for the new database feature.

Thus, illustrative embodiments provide one or more technical solutions that overcome a technical problem with providing valid SQL queries for a new database feature. Further, illustrative embodiments transform SQL queries to a different state or thing such that the SQL queries have a different function corresponding to the new database feature. As a result, these one or more technical solutions provide a technical effect and practical application in the field of SQL databases.

Figure 3:
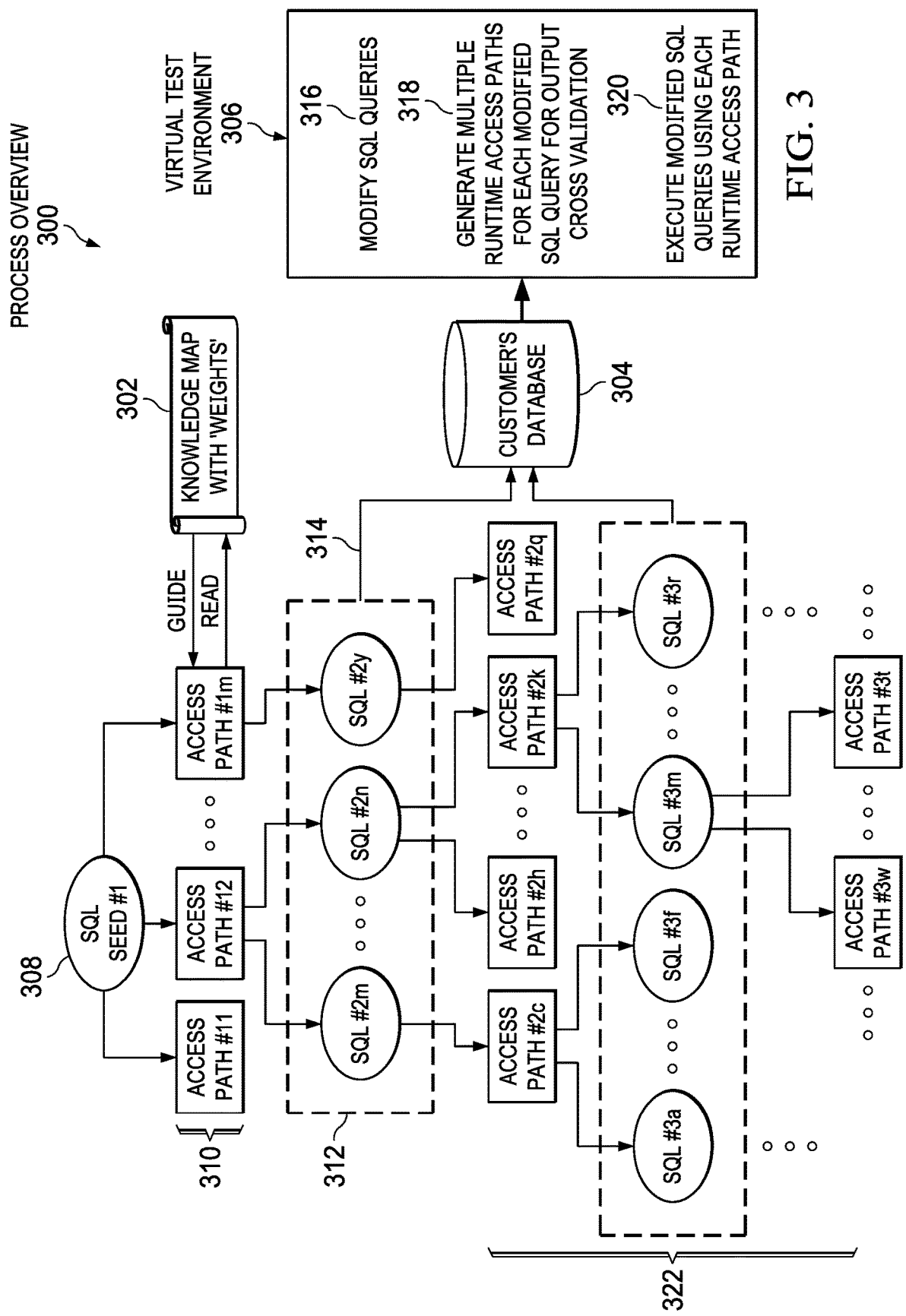
FIG. 3 is a diagram illustrating a process overview in accordance with an illustrative embodiment.

With reference now to FIG. 3, a diagram illustrating a process overview is depicted in accordance with an illustrative embodiment. Process overview 300 may be implemented in a network of data processing systems, such as network data processing system 100 in FIG. 1, or a cloud computing environment.

In this example, process overview 300 includes knowledge map with weights 302, customer's database 304, and virtual test environment 306. Knowledge map with weights 302 may be, for example, knowledge map 236 with weights 242 in FIG. 2. Customer's database 304 may be, for example, database 108 in FIG. 1 or associated with the identifier of database 220 in FIG. 2. Virtual test environment 306 may be, for example, virtual test environment 250 in FIG. 2.

Illustrative embodiments generated sample SQL query seed #1 308 in response to receiving an input to generate functional verification testcases for a new feature of customer's database 304. Sample SQL query seed #1 308 may be, for example, one of sample SQL query seeds 226 in FIG. 2. The new feature may be, for example, new feature 224 in FIG. 2.

At 310, illustrative embodiments generate a set of access paths for sample SQL query seed #1 308. At 312, illustrative embodiments evolve sample SQL query seed #1 308 to new SQL queries by adding other SQL clauses to sample SQL query seed #1 308 guided by information in knowledge map with weights 302.

At 314, illustrative embodiments locate real SQL queries, which are similar to the newly evolved SQL queries, within customer's database 304. At 316, illustrative embodiments modify the located real SQL queries, which are similar to the newly evolved SQL queries, by adding the new feature to the located real SQL queries. At 318, illustrative embodiments generate multiple runtime access paths for each modified real SQL query for output cross validation.

Further, illustrative embodiments execute the modified real SQL queries, which include the new feature, in virtual test environment 306 using the different runtime access paths corresponding to each modified real SQL query. At 322, illustrative embodiments repeat the process until no similar real SQL queries could be identified within customer's database 304.

With reference now to FIG. 4, a diagram illustrating an example of matrixes is depicted in accordance with an illustrative embodiment. Matrixes 400 may be, for example, matrixes 228 in FIG. 2. In this example, matrixes 400 include keyword-keyword matrix 402, access path-access path matrix 404, and keyword-access path matrix 406, such as keyword-keyword matrix 230, access path-access path matrix 232, and keyword-access path matrix 234 in FIG. 2.

Keyword-keyword matrix 402 includes keywords 408 and keywords 410. Keyword-keyword matrix 402 shows relationships between keywords 408 and keywords 410. For example, keyword "ORDER BY" of keywords 408 and keyword "AVG" of keywords 410 have a frequency of use together of "35", which indicates a strong relationship between those particular keywords. Access path-access path matrix 404 shows relationships between access paths 412 and access paths 414. For example, access path "IN-LIST" of access paths 412 and access path "SORT COMPOSITE" of access paths 414 have a frequency of use together of "0", which indicates no relationship between those particular access paths. Keyword-access path matrix 406 shows relationships between access paths 416 and keywords 418. For example, access path "INDEX ACCESS" of access paths 416 and keyword "DISTINCT" of keywords 418 have a frequency of use together of "5", which indicates a weak relationship between that particular combination of access path and keyword.

Figure 5:
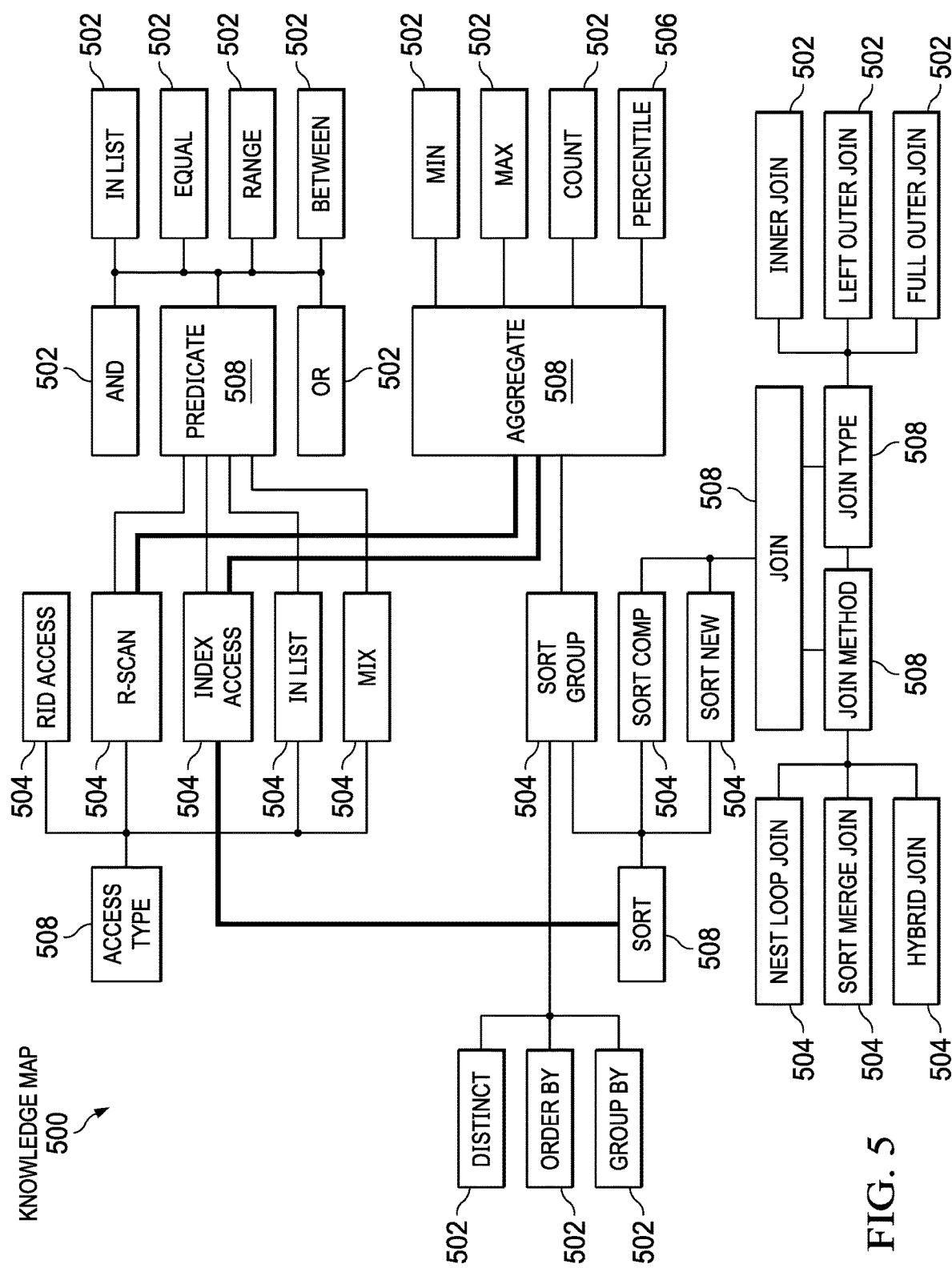
FIG. 5 is a diagram illustrating an example of a knowledge map in accordance with an illustrative embodiment.

With reference now to FIG. 5, a diagram illustrating an example of a knowledge map is depicted in accordance with an illustrative embodiment. Knowledge map 500 may be, for example, knowledge map 236 in FIG. 2. Knowledge map 500 shows the relationships, indicated by the edges or lines, between keywords 502, access paths 504, and new feature 506. New feature 506 may be, for example, new feature 224 in FIG. 2. In addition, knowledge map 500 organizes keywords 502, access paths 504, and new feature 506 by abstract sets 508. Abstract sets 508 may be, for example, topics or supersets. Further, knowledge map 500 may add weights, such as, for example, weights 242 in FIG. 2, to the different edges to indicate strength of relationships between each of keywords 502, access paths 504, new feature 506, and abstract sets 508.

Figure 6:
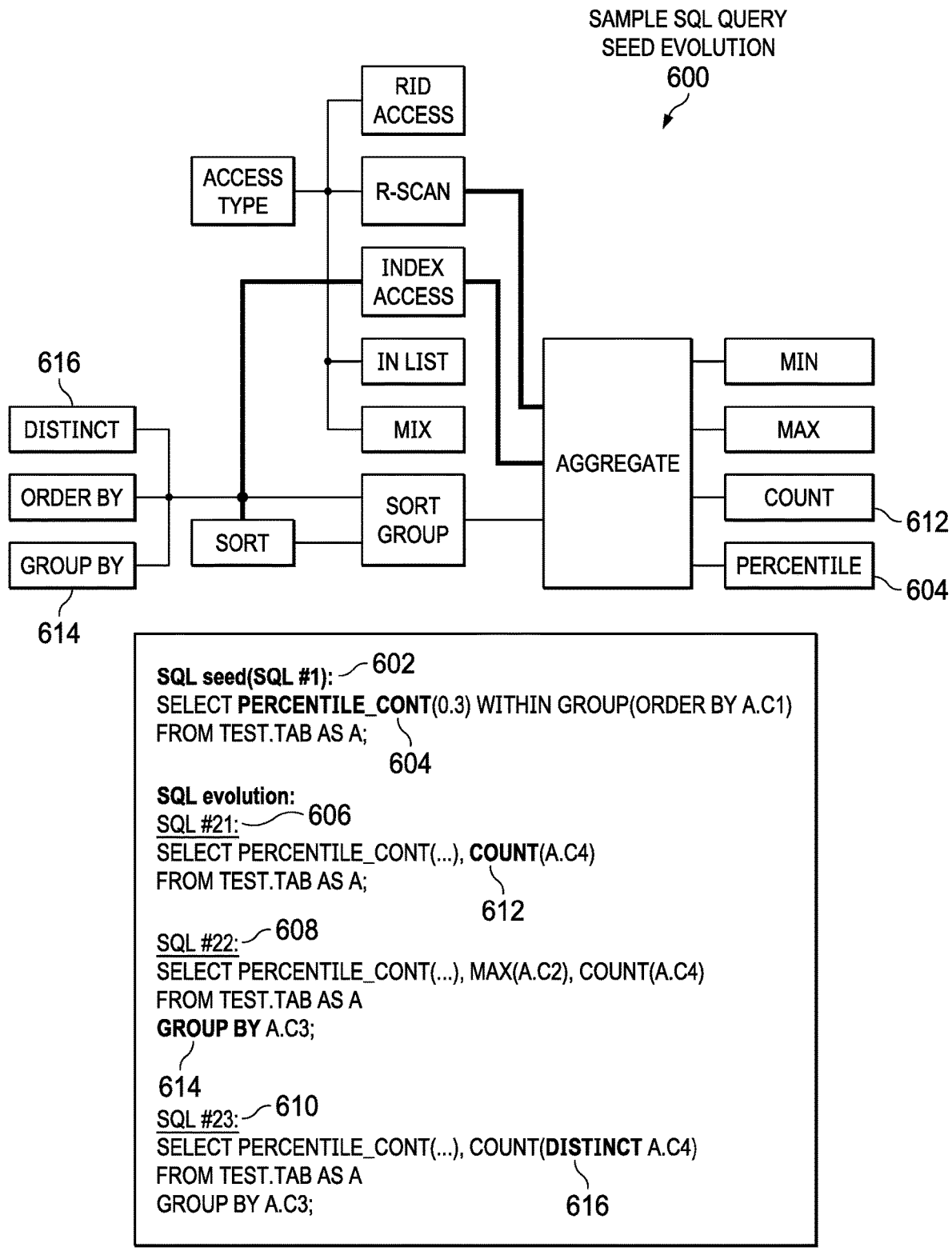
FIG. 6 is a diagram illustrating an example of sample SQL query seed evolution in accordance with an illustrative embodiment.

With reference now to FIG. 6, a diagram illustrating an example of sample SQL query seed evolution is depicted in accordance with an illustrative embodiment. Sample SQL query seed evolution 600 may be implemented in, for example, process overview 300 at 312 in FIG. 3. Sample SQL query seed evolution 600 shows development of sample SQL query seed #1 602. Sample SQL query seed #1 602 may be, for example sample SQL query seed #1 308 in FIG. 3.

Sample SQL query seed #1 602 contains new feature 604. New feature 604 may be, for example, new feature 224 in FIG. 2 or new feature 506 in FIG. 5. In this example, new feature 604 is "PERCENTILE_CONT".

In this example, illustrative embodiments evolve SQL query seed #1 602 into a set of newly evolved SQL queries that includes newly evolved SQL query #21 606, newly evolved SQL query #22 608, and newly evolved SQL query #23 610. Illustrative embodiments evolve SQL query seed #1 602 into the set of newly evolved SQL queries using a knowledge map, such as, for example, knowledge map 500 in FIG. 5, which shows the relationships between the different keywords.

Illustrative embodiments evolve SQL query seed #1 602 into newly evolved SQL query #21 606 by adding another SQL clause "COUNT" 612 to SQL query seed #1 602. Illustrative embodiments evolve SQL query #21 606 into newly evolved SQL query #22 608 by adding another SQL clause "GROUP BY" 614 to SQL query seed #21 606. Illustrative embodiments evolve SQL query seed #22 608 into newly evolved SQL query #23 610 by adding another SQL clause "DISTINCT" 616 to SQL query seed #22 608.

Figure 7:
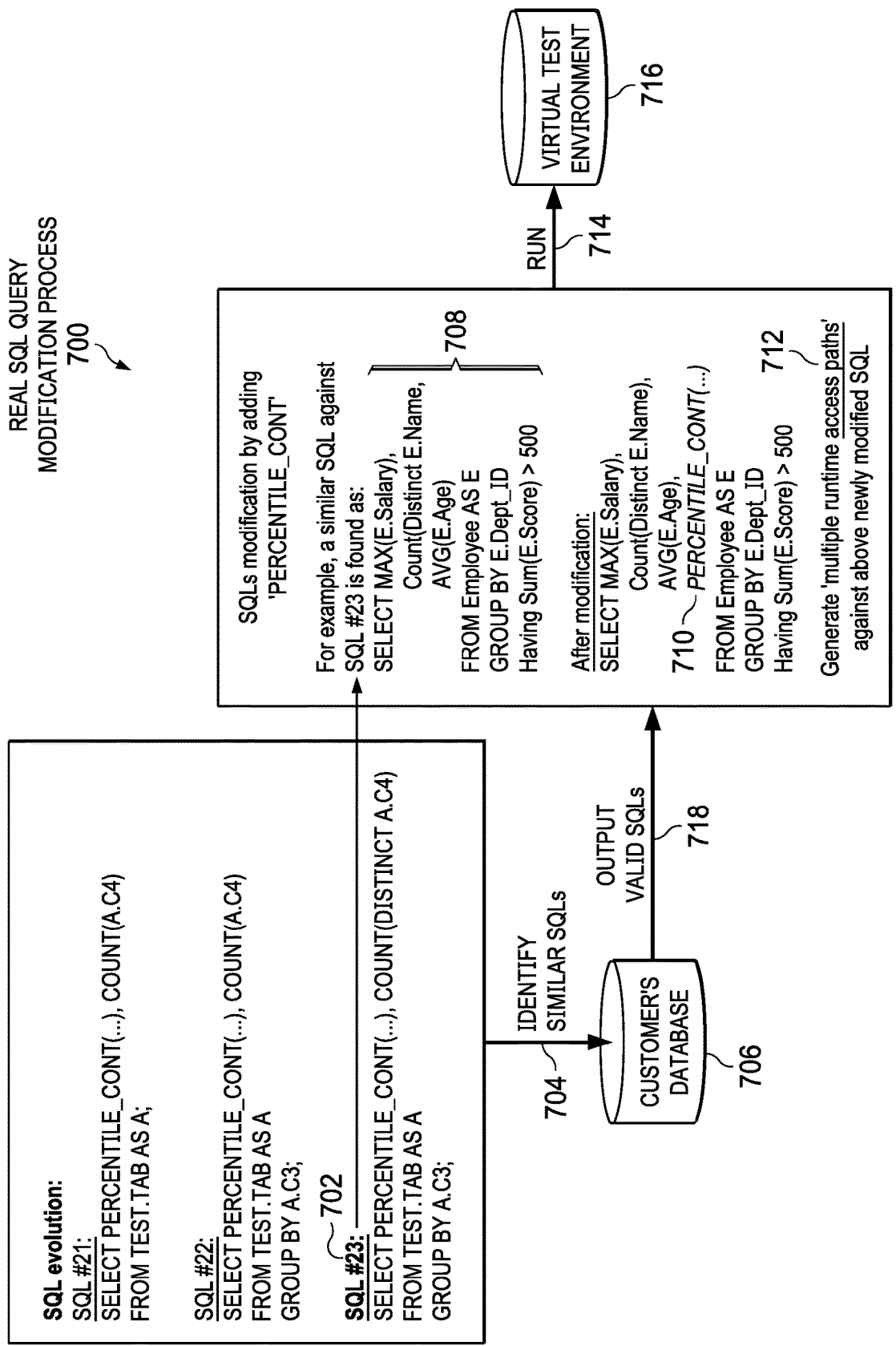
FIG. 7 is a diagram illustrating an example of real SQL query modification in accordance with an illustrative embodiment.

With reference now to FIG. 7, a diagram illustrating an example of real SQL query modification is depicted in accordance with an illustrative embodiment. Real SQL query modification process 700 may be implemented in, for example, process overview 300 at 316 in FIG. 3. Real SQL query modification process 700 includes newly evolved SQL query #23 702. Newly evolved SQL query #23 702 may be, for example, newly evolved SQL query #23 610 in FIG. 6.

At 704, illustrative embodiments identify real SQL queries, which are similar to newly evolved SQL query #23 702, in customer's database 706. Customer's database 706 may be, for example, customer's database 304 in FIG. 3. At 708, illustrative embodiments found a real SQL query that is similar to newly evolved SQL query #23 702.

Illustrative embodiments modify the real SQL query, which is similar to newly evolved SQL query #23 702, by adding new feature 710. In this example, new feature 710 is "PERCENTILE_CONT". At 712, illustrative embodiments generate multiple runtime access paths for the modified real SQL query.

At 714, illustrative embodiments run the modified real SQL query in virtual test environment 716 using each of the generated runtime access paths for output cross validation. At 718, illustrative embodiments output a set of valid SQL queries for new feature 710 based on a comparison of the outputs of the runtime access paths for the modified real SQL query.

With reference now to FIG. 8, a diagram illustrating an example of further SQL query evolution is depicted in accordance with an illustrative embodiment. Further SQL query evolution process 800 takes previously evolved SQL query #23 802, such as newly evolved SQL query #23 702 in FIG. 7, and further evolves previously evolved SQL query #23 802 into newly evolved SQL query #31 804, newly evolved SQL query #32 806, and newly evolved SQL query #41 808.

Further SQL query evolution process 800 further evolves previously evolved SQL query #23 802 into newly evolved SQL query #31 804 by adding another SQL clause 810 to previously evolved SQL query #23 802. Further SQL query evolution process 800 further evolves newly evolved SQL query #31 804 into newly evolved SQL query #32 806 by adding another SQL clause 812 to newly evolved SQL query #31 804. Further SQL query evolution process 800 further evolves newly evolved SQL query #32 806 into newly evolved SQL query #41 808 by adding another SQL clause 814 to newly evolved SQL query #32 806.

Further SQL query evolution process 800 utilizes the relationships between keywords and the strength of the relationships (i.e., weighted edges between keyword nodes) shown within knowledge map 816 to further evolve previously evolved SQL query #23 802 into newly evolved SQL query #31 804, newly evolved SQL query #32 806, and newly evolved SQL query #41 808. Knowledge map 816 may be, for example, knowledge map 500 in FIG. 5.

Figure 9A:
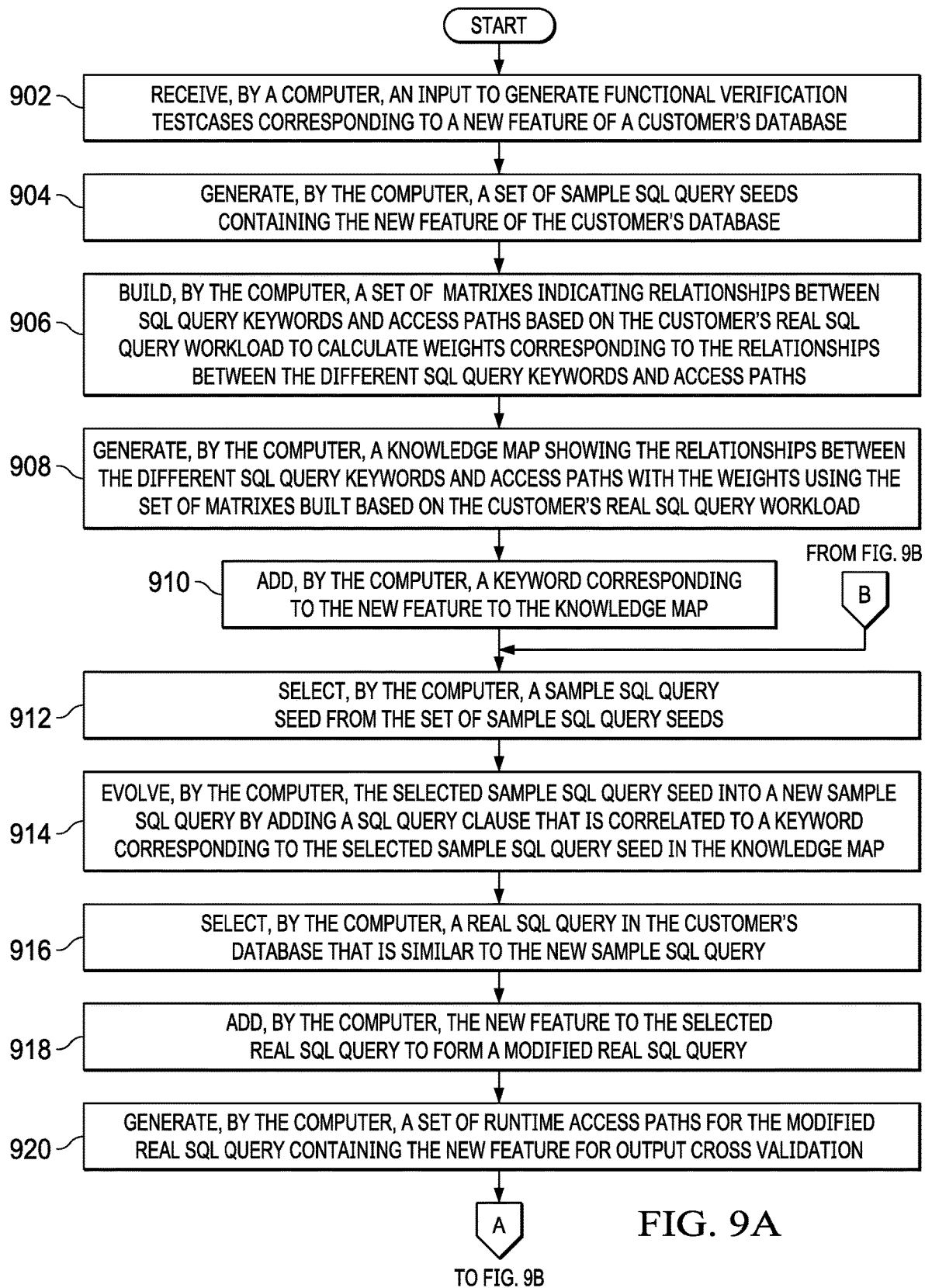
FIGS. 9A-9B are a flowchart illustrating a process for generating functional verification testcases corresponding to a new feature of a database in accordance with an illustrative embodiment.
Figure 9B:
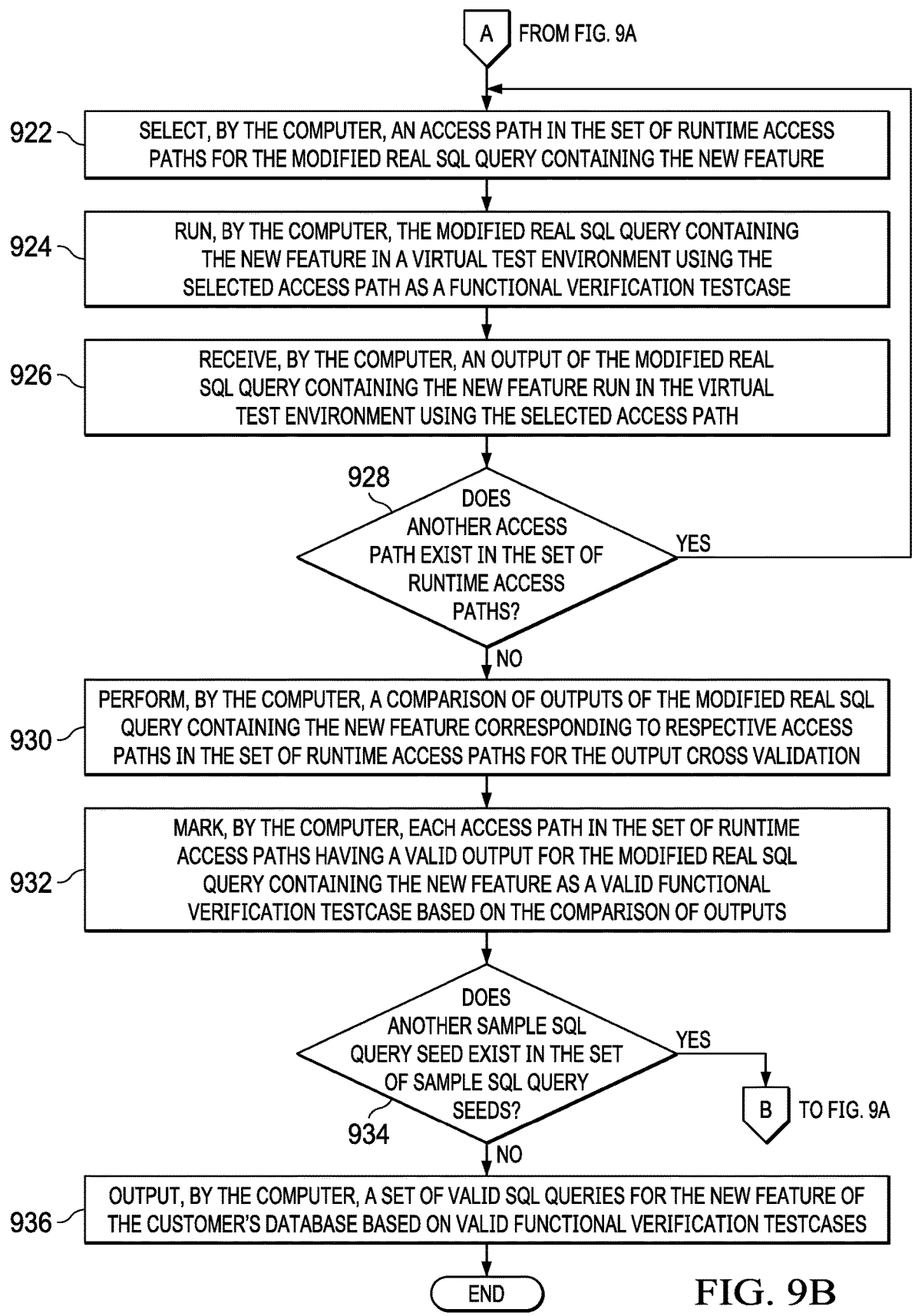

With reference now to FIGS. 9A-9B, a flowchart illustrating a process for generating functional verification testcases corresponding to a new feature of a database is shown in accordance with an illustrative embodiment. The process shown in FIGS. 9A-9B may be implemented in a computer, such as, for example, server 104 in FIG. 1 or data processing system 200 in FIG. 2.

The process begins when the computer receives an input to generate the functional verification testcases corresponding to the new feature of the customer's database (step 902). In response to receiving the input in step 902, the computer generates a set of sample SQL query seeds containing the new feature of the customer's database (step 904). In addition, the computer builds a set of matrixes indicating relationships between SQL query keywords and access paths based on the customer's real SQL query workload (e.g., usage) to calculate weights corresponding to the relationships between the different SQL query keywords and access paths (step 906).

Further, the computer generates a knowledge map showing the relationships between the different SQL query keywords and access paths with the weights using the set of matrixes built based on the customer's real SQL query workload (step 908). The computer also adds a keyword corresponding to the new feature to the knowledge map (step 910).

Furthermore, the computer selects a sample SQL query seed from the set of sample SQL query seeds (step 912). The computer evolves the selected sample SQL query seed into a new sample SQL query by adding a SQL query clause that is correlated to a keyword corresponding to the selected sample SQL query seed in the knowledge map (step 914).

Moreover, the computer selects a real SQL query in the customer's database that is similar to the new sample SQL query (step 916). The computer adds the new feature to the selected real SQL query to form a modified real SQL query (step 918). The computer generates a set of runtime access paths for the modified real SQL query containing the new feature for output cross validation (step 920).

The computer selects an access path in the set of runtime access paths for the modified real SQL query containing the new feature (step 922). The computer runs the modified real SQL query containing the new feature in a virtual test environment using the selected access path as a functional verification testcase (step 924). The computer receives an output of the modified real SQL query containing the new feature run in the virtual test environment using the selected access path (step 926).

The computer makes a determination as to whether another access path exists in the set of runtime access paths (step 928). If the computer determines that another access path does exist in the set of runtime access paths, yes output of step 928, then the process returns to step 922 where the computer selects another access path. If the computer determines that another access path does not exist in the set of runtime access paths, yes output of step 928, then the computer performs a comparison of outputs of the modified real SQL query containing the new feature corresponding to respective access paths in the set of runtime access paths for the output cross validation (step 930). The computer marks each access path in the set of runtime access paths having a valid output for the modified real SQL query containing the new feature as a valid functional verification testcase based on the comparison of outputs (step 932).

The computer makes a determination as to whether another sample SQL query seed exists in the set of sample SQL query seeds (step 934). If the computer determines that another sample SQL query seed does exist in the set of sample SQL query seeds, yes output of step 934, then the process returns to step 912 where the computer selects another sample SQL query seed. If the computer determines that another sample SQL query seed does not exist in the set of sample SQL query seeds, no output of step 934, then the computer outputs a set of valid SQL queries for the new feature of the customer's database based on valid functional verification testcases (step 936). Thereafter, the process terminates.

Figure 10:
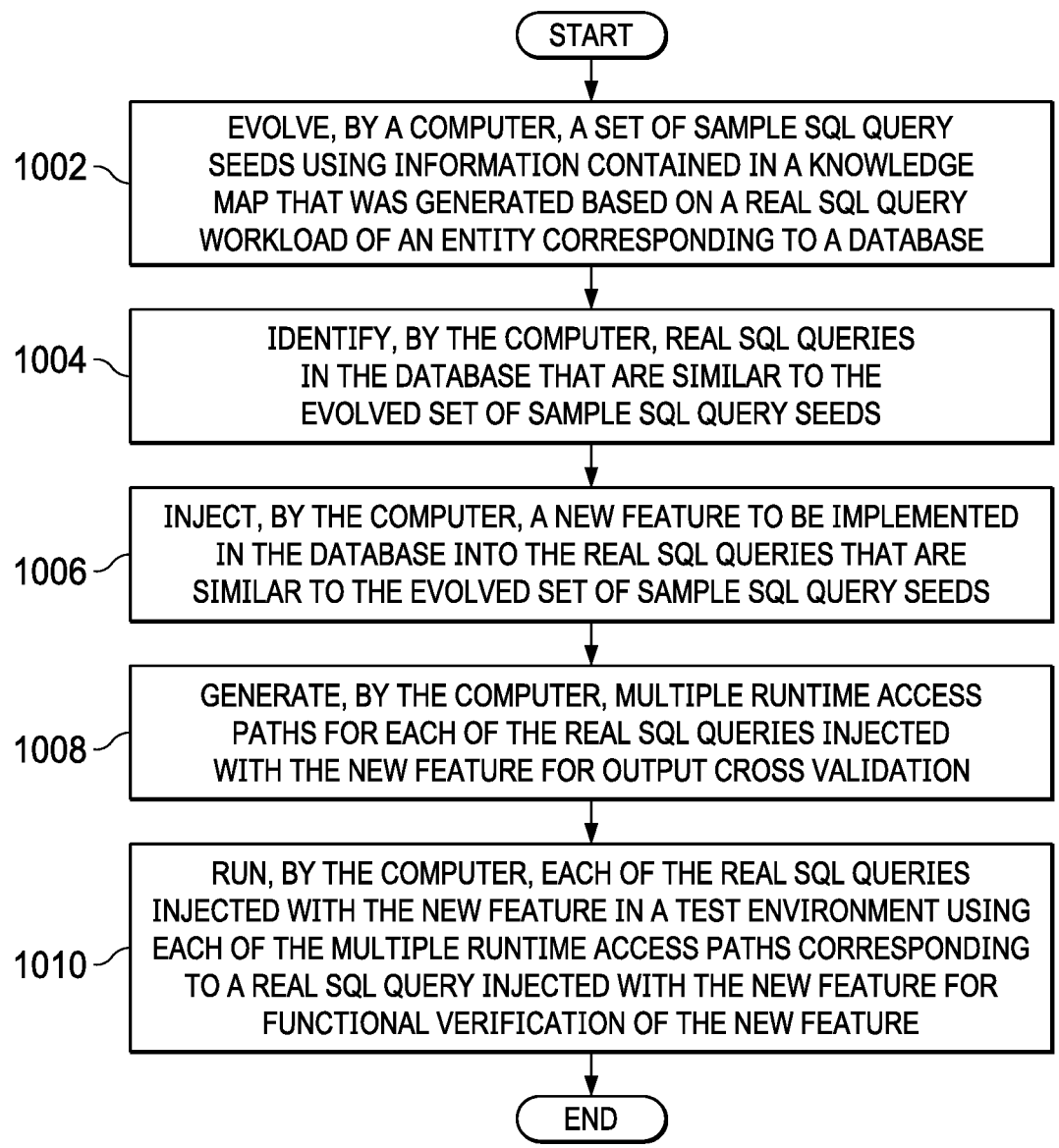
FIG. 10 is a flowchart illustrating a process for functional verification of a new database feature in accordance with an illustrative embodiment.

With reference now to FIG. 10, a flowchart illustrating a process for functional verification of a new database feature is shown in accordance with an illustrative embodiment. The process shown in FIG. 10 may be implemented in a computer, such as, for example, server 104 in FIG. 1 or data processing system 200 in FIG. 2.

The process begins when the computer evolves a set of sample SQL query seeds using information contained in a knowledge map that was generated based on a real SQL query workload of an entity corresponding to a database (step 1002). The computer identifies real SQL queries in the database that are similar to the evolved set of sample SQL query seeds (step 1004). The computer injects a new feature to be implemented in the database into the real SQL queries that are similar to the evolved set of sample SQL query seeds (step 1006).

The computer generates multiple runtime access paths for each of the real SQL queries injected with the new feature for output cross validation (step 1008). The computer runs each of the real SQL queries injected with the new feature in a test environment using each of the multiple runtime access paths corresponding to a real SQL query injected with the new feature for functional verification of the new feature (step 1010). Thereafter, the process terminates.

Thus, illustrative embodiments of the present invention provide a computer-implemented method, computer system, and computer program product for generating SQL functional verification testcases corresponding to a new feature of a cloud database. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for functional verification of a new database feature, the computer-implemented method comprising:
   evolving, by a computer, a set of sample structured query language (SQL) query seeds using information contained in a knowledge map that was generated based on a real SQL query workload of an entity corresponding to a database;
   identifying, by the computer, real SQL queries in the database that are similar to the evolved set of sample SQL query seeds;
   injecting, by the computer, a new feature to be implemented in the database into the real SQL queries that are similar to the evolved set of sample SQL query seeds;
   generating, by the computer, multiple runtime access paths for each of the real SQL queries injected with the new feature for output cross validation; and
   running, by the computer, each of the real SQL queries injected with the new feature in a test environment using each of the multiple runtime access paths corresponding to a real SQL query injected with the new feature for functional verification of the new feature.

2. The computer-implemented method of claim 1 further comprising:
   receiving, by the computer, an input to generate functional verification testcases corresponding to the new feature of the database; and
   generating, by the computer, the set of sample SQL query seeds containing the new feature of the database in response to receiving the input.

3. The computer-implemented method of claim 1 further comprising:
building, by the computer, a set of matrixes indicating relationships between SQL query keywords and access paths based on the real SQL query workload of the entity corresponding to the database to calculate weights corresponding to the relationships between different SQL query keywords and access paths.

4. The computer-implemented method of claim 3 further comprising:
generating, by the computer, the knowledge map showing the relationships between the different SQL query keywords and access paths with the weights using the set of matrixes built based on the real SQL query workload.

5. The computer-implemented method of claim 1 further comprising:
selecting, by the computer, a sample SQL query seed from the set of sample SQL query seeds; and
evolving, by the computer, the selected sample SQL query seed into a new sample SQL query by adding a SQL query clause that is correlated to a keyword corresponding to the selected sample SQL query seed in the knowledge map.

6. The computer-implemented method of claim 5 further comprising:
selecting, by the computer, a real SQL query in the database that is similar to the new sample SQL query;
adding, by the computer, the new feature to the selected real SQL query to form a modified real SQL query; and
generating, by the computer, a set of runtime access paths for the modified real SQL query containing the new feature for output cross validation.

7. The computer-implemented method of claim 6 further comprising:
selecting, by the computer, an access path in the set of runtime access paths for the modified real SQL query containing the new feature;
running, by the computer, the modified real SQL query containing the new feature in the test environment using the selected access path as a functional verification testcase;
receiving, by the computer, an output of the modified real SQL query containing the new feature run in the test environment using the selected access path;
determining, by the computer, whether another access path exists in the set of runtime access paths; and
responsive to the computer determining that another access path does exist in the set of runtime access paths, repeating, by the computer, the selecting, running, receiving, and determining steps.

8. The computer-implemented method of claim 7 further comprising:
responsive to the computer determining that another access path does not exist in the set of runtime access paths, performing, by the computer, a comparison of outputs of the modified real SQL query containing the new feature corresponding to respective access paths in the set of runtime access paths for the output cross validation; and
marking, by the computer, each access path in the set of runtime access paths having a valid output for the modified real SQL query containing the new feature as a valid functional verification testcase based on the comparison of outputs.

9. The computer-implemented method of claim 8 further comprising:
outputting, by the computer, a set of valid SQL queries for the new feature of the database based on valid functional verification testcases.

10. The computer-implemented method of claim 1, wherein the database is located in a cloud environment.

11. A computer system for functional verification of a new database feature, the computer system comprising:
a bus system;
a storage device connected to the bus system, wherein the storage device stores program instructions; and
a processor connected to the bus system, wherein the processor executes the program instructions to:
evolve a set of sample structured query language (SQL) query seeds using information contained in a knowledge map that was generated based on a real SQL query workload of an entity corresponding to a database;
identify real SQL queries in the database that are similar to the evolved set of sample SQL query seeds;
inject a new feature to be implemented in the database into the real SQL queries that are similar to the evolved set of sample SQL query seeds;
generate multiple runtime access paths for each of the real SQL queries injected with the new feature for output cross validation; and
run each of the real SQL queries injected with the new feature in a test environment using each of the multiple runtime access paths corresponding to a real SQL query injected with the new feature for functional verification of the new feature.

12. The computer system of claim 11, wherein the processor further executes the program instructions to:
receive an input to generate functional verification testcases corresponding to the new feature of the database; and
generate the set of sample SQL query seeds containing the new feature of the database in response to receiving the input.

13. The computer system of claim 11, wherein the processor further executes the program instructions to:
build a set of matrixes indicating relationships between SQL query keywords and access paths based on the real SQL query workload of the entity corresponding to the database to calculate weights corresponding to the relationships between different SQL query keywords and access paths.

14. The computer system of claim 13, wherein the processor further executes the program instructions to:
generate the knowledge map showing the relationships between the different SQL query keywords and access paths with the weights using the set of matrixes built based on the real SQL query workload.

15. A computer program product for functional verification of a new database feature, the computer program product comprising a computer readable storage medium having program instructions embodied therewith, the program instructions executable by a computer to cause the computer to perform a method comprising:
evolving, by the computer, a set of sample structured query language (SQL) query seeds using information contained in a knowledge map that was generated based on a real SQL query workload of an entity corresponding to a database;
identifying, by the computer, real SQL queries in the database that are similar to the evolved set of sample SQL query seeds;

injecting, by the computer, a new feature to be implemented in the database into the real SQL queries that are similar to the evolved set of sample SQL query seeds;

generating, by the computer, multiple runtime access paths for each of the real SQL queries injected with the new feature for output cross validation; and running, by the computer, each of the real SQL queries injected with the new feature in a test environment using each of the multiple runtime access paths corresponding to a real SQL query injected with the new feature for functional verification of the new feature.

16. The computer program product of claim 15 further comprising:

receiving, by the computer, an input to generate functional verification testcases corresponding to the new feature of the database; and generating, by the computer, the set of sample SQL query seeds containing the new feature of the database in response to receiving the input.

17. The computer program product of claim 15 further comprising:

building, by the computer, a set of matrixes indicating relationships between SQL query keywords and access paths based on the real SQL query workload of the entity corresponding to the database to calculate weights corresponding to the relationships between different SQL query keywords and access paths.

18. The computer program product of claim 17 further comprising:

generating, by the computer, the knowledge map showing the relationships between the different SQL query keywords and access paths with the weights using the set of matrixes built based on the real SQL query workload.

19. The computer program product of claim 15 further comprising:

selecting, by the computer, a sample SQL query seed from the set of sample SQL query seeds; and evolving, by the computer, the selected sample SQL query seed into a new sample SQL query by adding a SQL query clause that is correlated to a keyword corresponding to the selected sample SQL query seed in the knowledge map.

20. The computer program product of claim 19 further comprising:

selecting, by the computer, a real SQL query in the database that is similar to the new sample SQL query;

adding, by the computer, the new feature to the selected real SQL query to form a modified real SQL query; and generating, by the computer, a set of runtime access paths for the modified real SQL query containing the new feature for output cross validation.

\* \* \* \* \*